Jan. 15, 1946.　　　　　B. A. ROSE　　　　　2,393,065

FRAMELESS DYNAMO-ELECTRIC MACHINE

Filed Jan. 28, 1943

WITNESSES:
Wm. B. Sellers.

INVENTOR
Bennie A. Rose.
BY O. B. Buchanan
ATTORNEY

Patented Jan. 15, 1946

2,393,065

UNITED STATES PATENT OFFICE 2,393,065

FRAMELESS DYNAMOELECTRIC MACHINE

Bennie A. Rose, Wilkinsburg, Pa., assignor to Westinghouse Electric Corporation, East Pittsburgh, Pa., a corporation of Pennsylvania Application January 28, 1943, Serial No. 473,844

2 Claims. (Cl. 171—252)

My invention relates to motors, generators, or other dynamo-electric machines, and it has particular relation to the design of the stator-member of such a machine, whereby a minimum weight is obtained, while at the same time providing a rugged structure which may be called upon to have a very considerable rigidity, both torsionally as well as in bending, even to the point of constituting a part of the supporting structure of the device in which the machine is mounted, or a part of the supporting structure of the rotating apparatus which is mechanically connected to the machine. My invention is particularly designed for the stator-core structure of a high-speed light-weight motor or generator for use in propelling an airplane, in electrical airplane propulsion-apparatus of the type described and claimed in an application of L. A. Kilgore, F. W. Godsey, Jr., F. B. Powers and myself, Serial No. 474,474, filed February 2, 1943, assigned to the Westinghouse Electric & Manufacturing Company.

In such airplane-propulsion dynamo-electric machines, a phenomenally light weight per horsepower is required, something like 0.3 or 0.4 pound per horsepower, as compared with 20 pounds per horsepower, for some commercial dynamo-electric machines. Such extremely light weights are obtained by resorting to very high speeds of rotation, approaching the highest speeds that can be safely withstood by present-day materials. The operational speed is also higher than can be successfully withstood by present-day commutators, so that direct-current machines are ruled out, and hence the machines must be of the alternating current type. Furthermore, the speed is higher than can be obtained in either a synchronous or an induction motor or generator at any commercial frequency, so that unusually high frequencies are required, something of the order of 500 cycles, or from 150 or 200 cycles to 700 cycles per second.

In order to achieve such light weight per horsepower as is required, it is necessary, in addition to the high-speed design, to resort to every possible available expedient for reducing the weight of the machine, utilizing magnetizable material only where magnetic flux must be carried, utilizing high-strength structural steel only when high strength is required, utilizing special light-weight metals and alloys, such as aluminum and magnesium, wherever possible, utilizing special insulating materials, such as the silicones, which permit operation at abnormally high temperatures, which may be of the order of 200° C., and of course utilizing only the best of materials in each case, and only the smallest possible quantities of such materials. With the foregoing considerations in mind, my invention relates to the design of the stator-member of a synchronous or induction motor or generator of the type just described.

An object of my invention is to provide a frameless stator-core structure and method of assembly, in which the magnetizable laminations, of the minimum size necessary to carry the flux, are stacked in a pressing fixture and clamped tightly together between two relatively thick endplates, by means of pressure applied in the pressing fixture. While the core is held in the press, a plurality of bolts or other metal tension-members are applied, for holding the two end-plates tight up against the stack of laminations, the bolts lying along the outer periphery of the laminations. While the assembly is thus still held in the press, with the bolts tight in place, the bolts are welded to the outer periphery of the laminations. These lines of welding serve to impart all necessary rigidity to the stack of laminations, both torsionally as well as in bending, so that the usual outer frame-structure or support is not needed in my machine.

I am aware that bolted core-structures have been known and utilized heretofore, but not in the same combination of bolts and welding. A sufficiently heavy pressure, maintained between the laminations, would accomplish the same result, so far as rigidity and strength is concerned, but the size of the bolts that would be required to maintain that pressure would be too great to meet the weight-requirements which are desired in these extremely light-weight airplane-propulsion machines. In my design, I utilize bolts which are so small in diameter that the bolts themselves do not constitute rigid frame-members, and so small in diameter that the clamping-pressure between the laminations, as exerted by said bolts, is of itself insufficient to make a reliably rigid structure. However, the welding produces the required rigidity, without the need of an excessive inter-laminar pressure.

With the foregoing and other objects in view, my invention consists in the structures, combinations and methods hereinafter described and claimed, and illustrated in the accompanying drawing, wherein:

Figure 1:
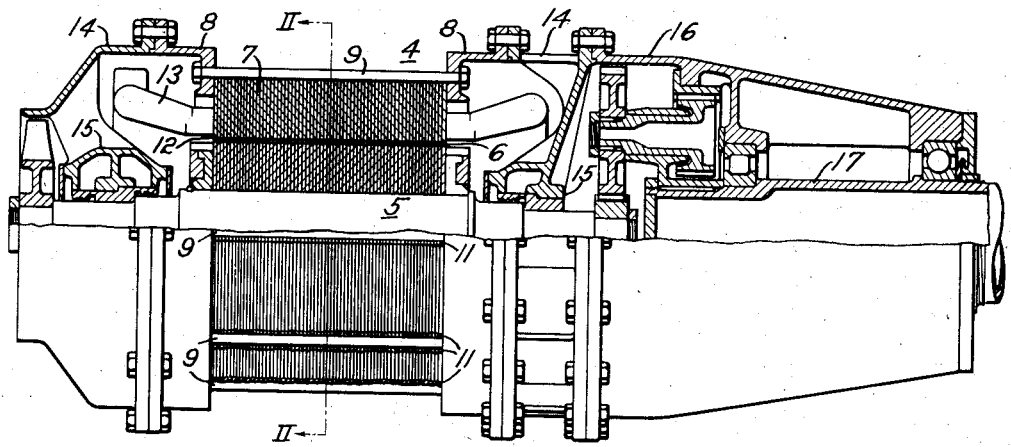
Figure 1 is a longitudinal sectional view of a dynamo-electric machine embodying my invention in the form of a high-speed induction-motor for driving a propeller-shaft on an airplane.
Figure 2:
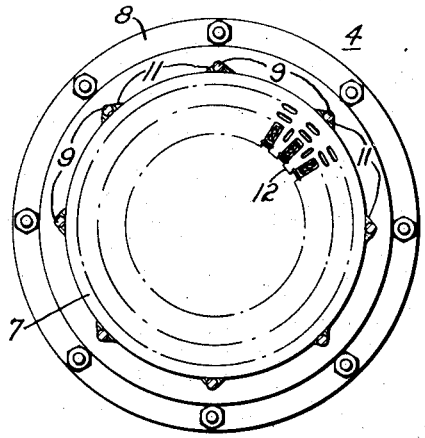
Fig. 2 is a transverse sectional view of the stator-member.

As shown in the drawing, my invention is applicable to the type of dynamo-electric machine comprising an external stator-member 4 and an internal rotor-member 5, with an airgap 6 in between. My invention relates particularly to the stator-member 4, which comprises a plurality of stacked, relatively thin, magnetizable laminations 7, a pair of relatively thick end-plates 8, one at each end of the stack of laminations, a plurality of bolts 9, or other metal tension-members, connecting the two end-plates together and lying alongside of the outer periphery of the stack of laminations 7, and one, or preferably two, lines of welding 11 extending along each of the bolts 9 for effecting a welded joint between said bolt and the outer periphery of the stack of laminations, said lines of welding extending substantially along the entire length of the stack.

The stack of laminations 7 comprise the stator-core, which is provided with a cylindrical bore 12 constituting one boundary of the airgap 6, and carrying the stator-winding 13, which may be a three-phase primary winding of any suitable pole-number, such as four poles. Each of the end-plates 8 supports an end-housing structure 14 which may not only serve as the supporting-means for the motor, but which also carries a bearing-member 15 for rotatably supporting the rotor-member 5.

In the particular machine which is illustrated in the drawing, one of the end-housings 14 also supports the frame 16 of a reduction-gear member which drives one of the propeller-shafts 17 of an airplane, the propeller-shaft operating at a speed of the order of 1200 to 2000 revolutions per minute, while the motor operates at a speed which may be in the range between 10,000 and 20,000 revolutions per minute, more or less. This high-speed motor and reduction-gear combination results in a lighter overall weight than a design in which a motor running at the relatively low speed required by the propeller is direct-connected to the propeller-shaft. In my illustrated design, it will be observed that the bending-forces resulting from the supporting of one end of the propeller-shaft 17, as well as the torsional forces for driving said shaft, must be withstood by the stator-core structure 4 of the motor.

As previously outlined, in the statement of the general objects and nature of the invention, my stator-core structure 4 is designed so that the bolts 9 are too small in diameter to constitute rigid frame-members of themselves, and too small in diameter to maintain an inter-laminar clamping-pressure heavy enough to be sufficient, by itself, to make a reliably rigid stator-core structure. However, the rows of welding 11 add such great rigidity to the assembly of core-laminations 7, that the necessary rigidity of structure is obtained without the need of abnormally heavy pressure between the laminations, and without the need of the usual frame-structure which commonly surrounds the stator-core laminations in the more common form of design of dynamo-electric machines.

Figure 3:
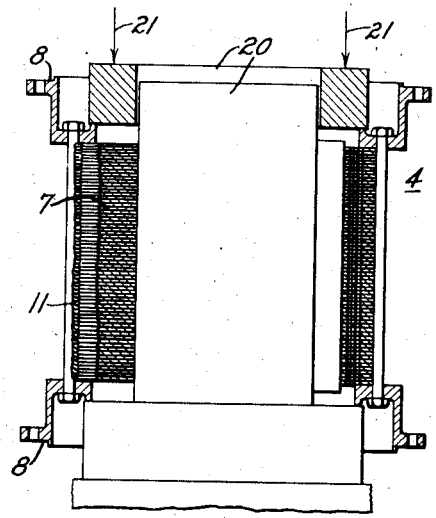
Fig. 3 is a view illustrating the method of building the stator-core in a pressing-fixture.

I preferably use a special assembly-method in manufacturing the stator-core element before the windings 13 are put into place, and before the end-housings 14 are attached. According to this assembly-method, which is illustrated in Fig. 3, the laminations 7 are stacked, in a pressing-fixture 20, between the two end-plates 8, and pressure is applied to the pressing-fixture, as indicated by the arrows 21. Then, while the assembly is in the pressing-fixture, with pressure still applied thereto, the bolts 9 are added and tightened in place. Then, while the assembly is still in the pressing fixture, with pressure still applied thereto, and with the bolts held tight in tension, one, or preferably two, lines of welding 11 are applied alongside of each bolt 9 for welding the bolt to the outer periphery of the stack of laminations 7 throughout substantially the entire length of the stack. After the core-assembly is thus completed, the pressure of the pressing-fixture 20 is released and the completed core-assembly is removed from the pressing-fixture.

While I have illustrated and described my invention in connection with a single illustrative form of embodiment thereof, it should be understood that the invention is susceptible of considerable variation in its precise form of embodiment, as will be understood by those skilled in the art. I desire, therefore, that the appended claims shall be accorded the broadest construction consistent with their language.

I claim as my invention:

1. A dynamo-electric machine comprising an external stator-member and an internal rotor-member with an airgap in between, characterized by said stator-member comprising a plurality of stacked, relatively thin, magnetizable laminations, a pair of relatively thick end-plates, one at each end of the stack of laminations, said stack of laminations having a cylindrical bore constituting one boundary of said airgap, a rotor-supporting bearing-member carried by each end-plate, a plurality of metal tension-members connecting the two end-plates together and lying alongside of the outer periphery of said stack of laminations, and a line of welding extending along each of a plurality of said metal tension-members for effecting a welded joint between its tension-member and the outer periphery of said stack of laminations, whereby said lines of welding serve to impart all necessary rigidity to said stack of laminations both torsionally as well as in bending, said tension-members being too small in cross-sectional area to constitute rigid frame-members of themselves, and so small in cross-sectional area that the clamping-pressure between the laminations, as exerted by said tension-members, is of itself insufficient to make a reliably rigid structure.

2. A dynamo-electric-machine stator-core which practically acts as its own frame, said core comprising a plurality of stacked, relatively thin, magnetizable laminations, a pair of relatively thick end-plates, one at each end of the stack of laminations, a plurality of metal tension-members connecting the two end-plates together and lying alongside of the outer periphery of said stack of laminations, and a line of welding extending along each of a plurality of said metal tension-members for effecting a welded joint between its tension-member and the outer periphery of said stack of laminations, whereby said lines of welding serve to impart all necessary rigidity to said stack of laminations both torsionally as well as in bending, said tension-members being too small in cross-sectional area to constitute rigid frame-members of themselves, and so small in cross-sectional area that the clamping-pressure between the laminations, as exerted by said tension-members, is of itself insufficient to make a reliably rigid structure.

BENNIE A. ROSE.